(12) United States Patent
Tanemura et al.

(10) Patent No.: US 10,296,148 B2
(45) Date of Patent: May 21, 2019

(54) FULL-BRIDGE STRAIN-GAUGE ARRAY OF FINGER THERMAL COMPENSATION

(71) Applicant: Synaptics Incorporated, San Jose, CA (US)

(72) Inventors: Tetsuo Tanemura, Tokyo (JP); Tom R. Vandermeijden, Los Gatos, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 310 days.

(21) Appl. No.: 15/252,420

(22) Filed: Aug. 31, 2016

(65) Prior Publication Data
US 2018/0059820 A1    Mar. 1, 2018

(51) Int. Cl.
*G06F 3/041* (2006.01)
*G06F 3/044* (2006.01)

(52) U.S. Cl.
CPC .............. *G06F 3/044* (2013.01); *G06F 3/041* (2013.01); *G06F 3/0412* (2013.01); *G06F 3/0414* (2013.01); *G06F 3/0418* (2013.01); *G06F 2203/04105* (2013.01); *G06F 2203/04111* (2013.01)

(58) Field of Classification Search
None
See application file for complete search history.

(56) References Cited

U.S. PATENT DOCUMENTS

| | | | |
|---|---|---|---|
| 4,213,348 A | 7/1980 | Reinertson et al. | |
| 4,444,054 A | 4/1984 | Schaff, Jr. | |
| 5,253,532 A | 10/1993 | Kamens | |
| 6,318,183 B1 | 11/2001 | Czarnocki | |
| 8,305,358 B2 | 11/2012 | Klinghult et al. | |
| 8,780,074 B2 | 7/2014 | Castillo et al. | |
| 9,116,569 B2 | 8/2015 | Stacy et al. | |
| 2003/0130804 A1 | 7/2003 | Potyrailo et al. | |

(Continued)

FOREIGN PATENT DOCUMENTS

| | | |
|---|---|---|
| EP | 2685358 A1 | 1/2014 |
| GB | 654736 A | 6/1951 |

(Continued)

OTHER PUBLICATIONS

International Search Report and Written Opinion for PCT/US2017/049690 dated Dec. 4, 2017, 16 pages.

*Primary Examiner* — Nicholas J Lee
(74) *Attorney, Agent, or Firm* — Ferguson Braswell Fraser Kubasta PC

(57) ABSTRACT

A force sensor having a strain gauge array including force sensing electrodes arranged in a full-bridge configuration comprising at least two of a first resistor type and at least two of a second resistor type, wherein the at least two of the first resistor type form a first force sensing node and the at least two of the second resistor type form a second force sensing node, a processing system communicatively coupled to the force sensing electrodes, the processing system being configured to receive a first signal from the first force sensing node and a second signal from the second force sensing node, wherein the first signal includes a thermal response, and the second signal includes the thermal response and an applied force, and remove the thermal response by comparing the first and second signals to obtain the applied force.

12 Claims, 6 Drawing Sheets

(56) References Cited

U.S. PATENT DOCUMENTS

| | | |
|---|---|---|
| 2013/0082970 A1 | 4/2013 | Frey et al. |
| 2013/0154998 A1* | 6/2013 | Yang ............... H03K 17/9625 345/174 |
| 2013/0215056 A1 | 8/2013 | Johansson et al. |
| 2014/0015746 A1 | 1/2014 | Hargreaves et al. |
| 2014/0376595 A1* | 12/2014 | Daley .................. H01L 28/20 374/185 |
| 2015/0116260 A1 | 4/2015 | Hoen et al. |
| 2015/0122531 A1 | 5/2015 | Monson et al. |
| 2015/0242037 A1 | 8/2015 | Pedder et al. |
| 2015/0331524 A1 | 11/2015 | McMillen |
| 2016/0048266 A1 | 2/2016 | Smith et al. |
| 2016/0147353 A1 | 5/2016 | Filiz et al. |

FOREIGN PATENT DOCUMENTS

| | | |
|---|---|---|
| GB | 2011707 A | 7/1979 |
| GB | 2457096 A | 8/2009 |
| WO | 2005054777 A1 | 6/2005 |

\* cited by examiner

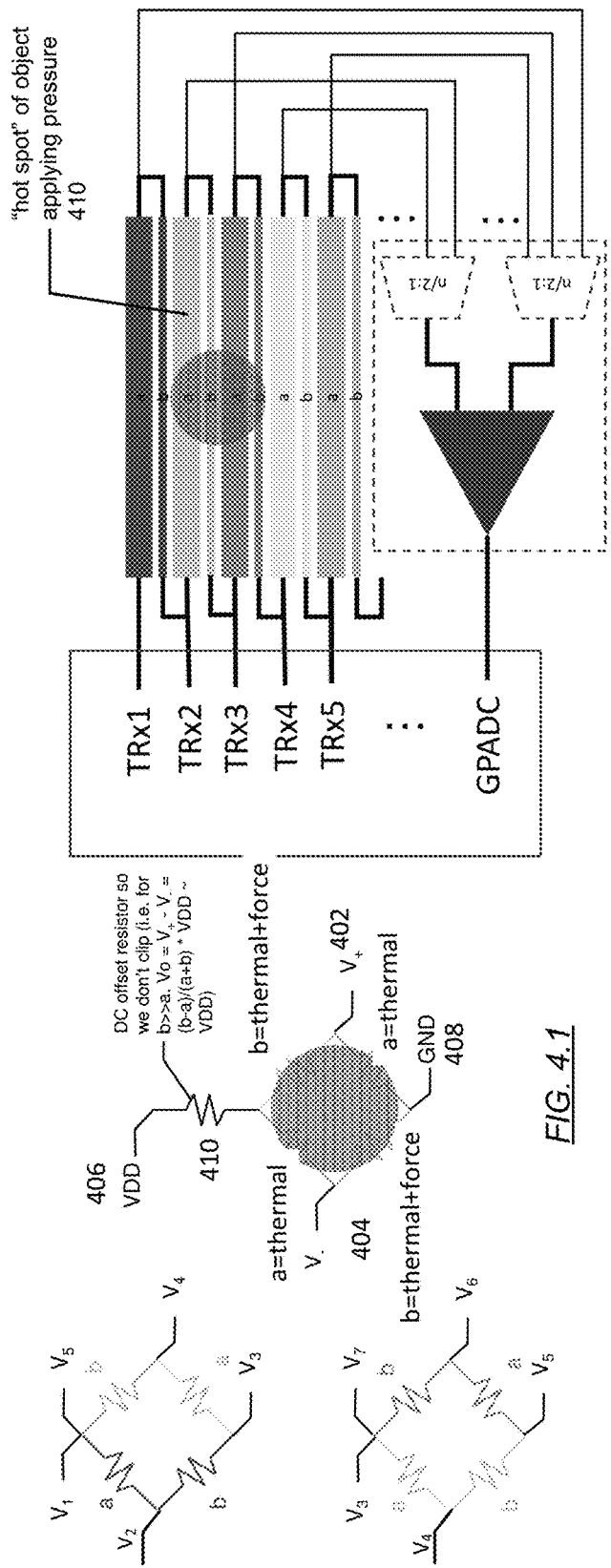
FIG. 4.2
FIG. 4.1
FIG. 4.3

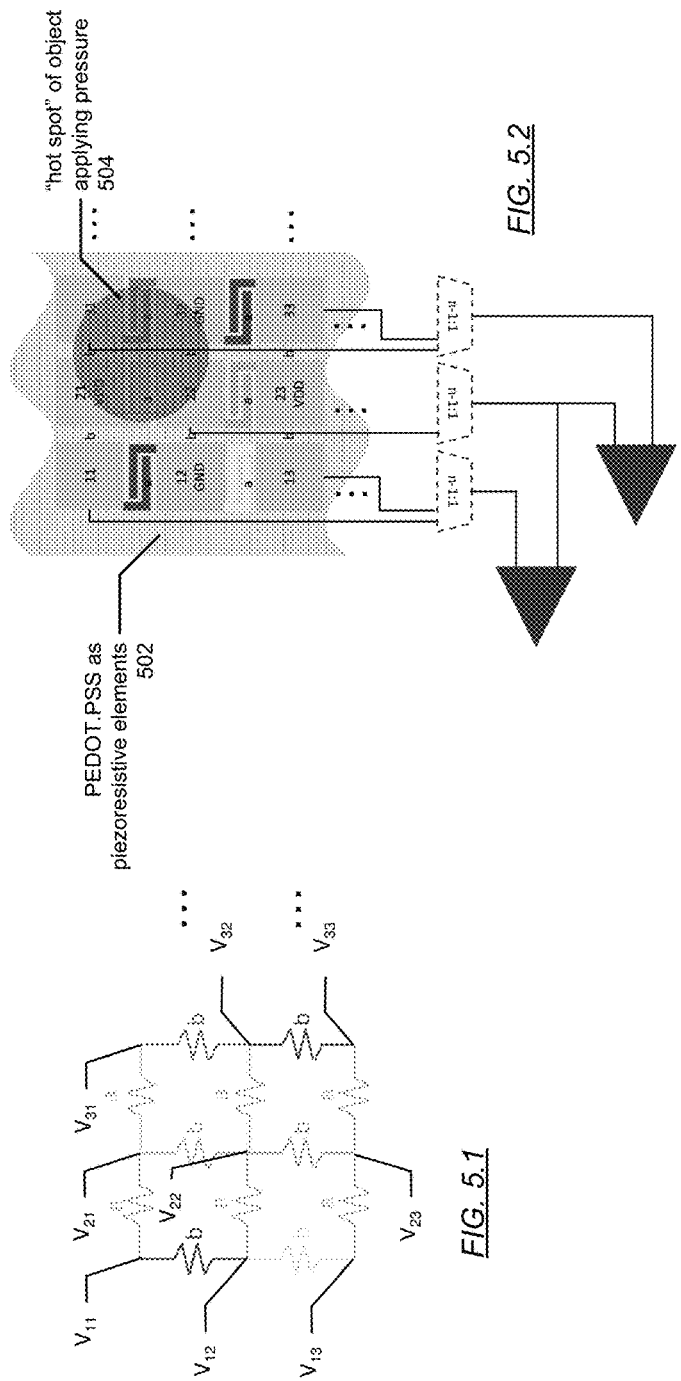

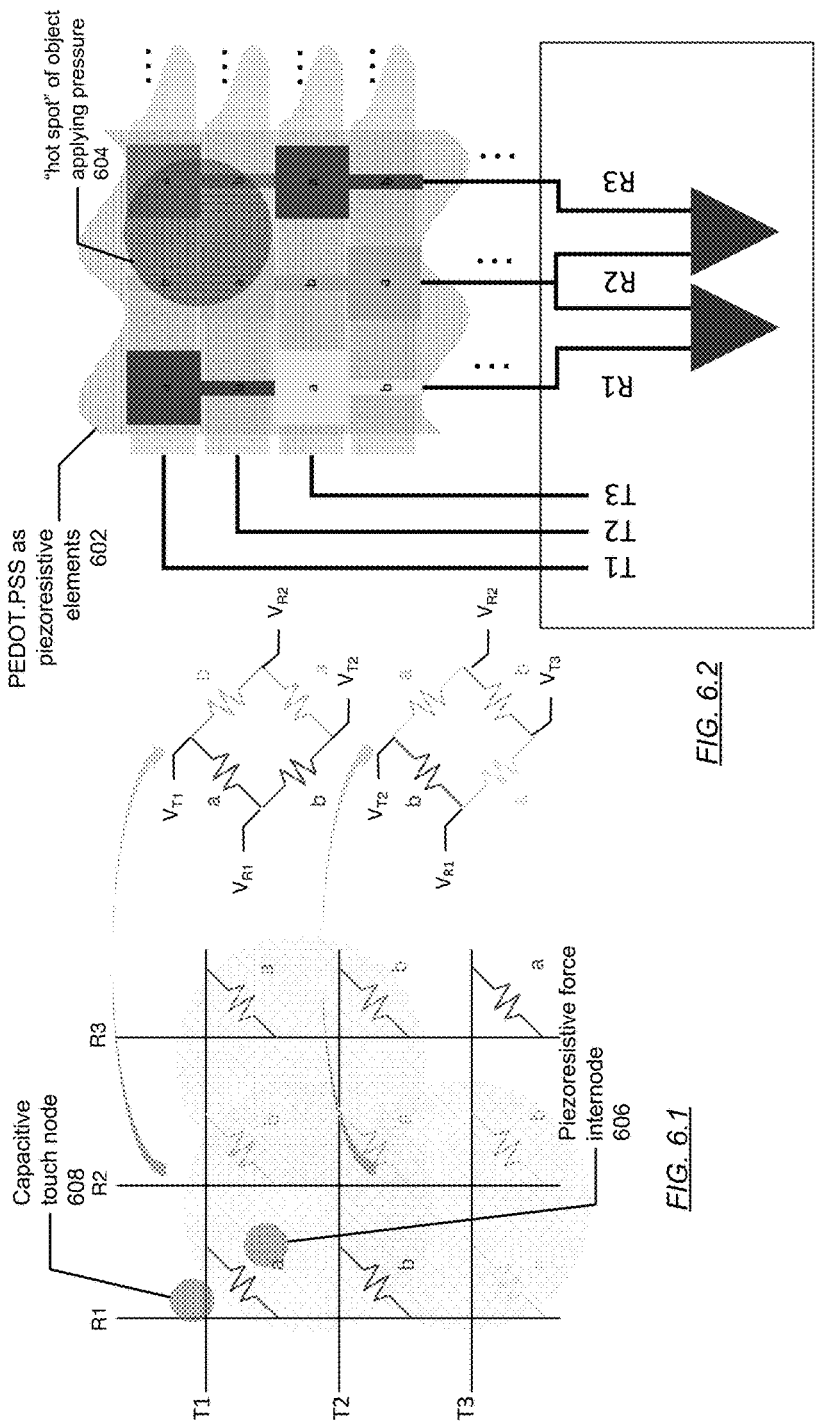

FULL-BRIDGE STRAIN-GAUGE ARRAY OF FINGER THERMAL COMPENSATION

FIELD

This invention generally relates to electronic devices.

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

In general, in one aspect, the invention relates to a force sensor, comprising a strain gauge array comprising force sensing electrodes arranged in a full-bridge configuration comprising at least two of a first resistor type and at least two of a second resistor type, wherein the at least two of the first resistor type form a first force sensing node and the at least two of the second resistor type form a second force sensing node, a processing system communicatively coupled to the force sensing electrodes, the processing system being configured to receive a first signal from the first force sensing node and a second signal from the second force sensing node, wherein the first signal comprises a thermal response, and the second signal comprises the thermal response and an applied force, and remove the thermal response by comparing the first and second signals to obtain the applied force.

In general, in one aspect, the invention relates to an input device, comprising a display configured to present information to a user, an input surface, a plurality of piezo-resistive electrodes arranged in a full-bridge strain gauge array in a sensing area of the input surface, the piezo-resistive electrodes comprising at least two of a first resistor type and at least two of a second resistor type, wherein the at least two of the first resistor type form a first force sensing node and the at least two of the second resistor type form a second force sensing node, and a processing system communicatively coupled to the display and the input device, the processing system configured to receive a first signal from the first force sensing node and a second signal from the second force sensing node, wherein the first signal comprises a thermal response, and the second signal comprises the thermal response and an applied force, and remove the thermal response by comparing the first and second signals to obtain the applied force.

In general, in one aspect, the invention relates to a processing system, comprising sensor circuitry communicatively coupled to a plurality of force sensing electrodes arranged in a full-bridge strain gauge array, the force sensing electrodes comprising at least two of a first resistor type and at least two of a second resistor type, wherein the at least two of the first resistor type form a first force sensing node and the at least two of the second resistor type form a second force sensing node, and a processor configured to receive a first signal from the first force sensing node and a second signal from the second force sensing node, wherein the first signal comprises a thermal response, and the second signal comprises the thermal response and an applied force, and remove the thermal response by comparing the first and second signals to obtain the applied force.

Other aspects of the invention will be apparent from the following description and the appended claims.

BRIEF DESCRIPTION OF DRAWINGS

FIG. 2.2 shows a table corresponding to the circuit diagram of FIG. 2.1 in accordance with one or more embodiments of the invention.

FIGS. 4.1, 4.2, and 4.3 show examples of an array of piezoresistive elements in a full-bridge configuration for a first topology in accordance with one or more embodiments.

FIGS. 5.1, 5.2, and 5.3 show examples of an array of piezoresistive elements in a full-bridge configuration for a second topology in accordance with one or more embodiments.

FIGS. 6.1, 6.2, and 6.3 show examples of an array of piezoresistive elements in a full-bridge configuration for a third topology in accordance with one or more embodiments.

DETAILED DESCRIPTION

Figure 1:
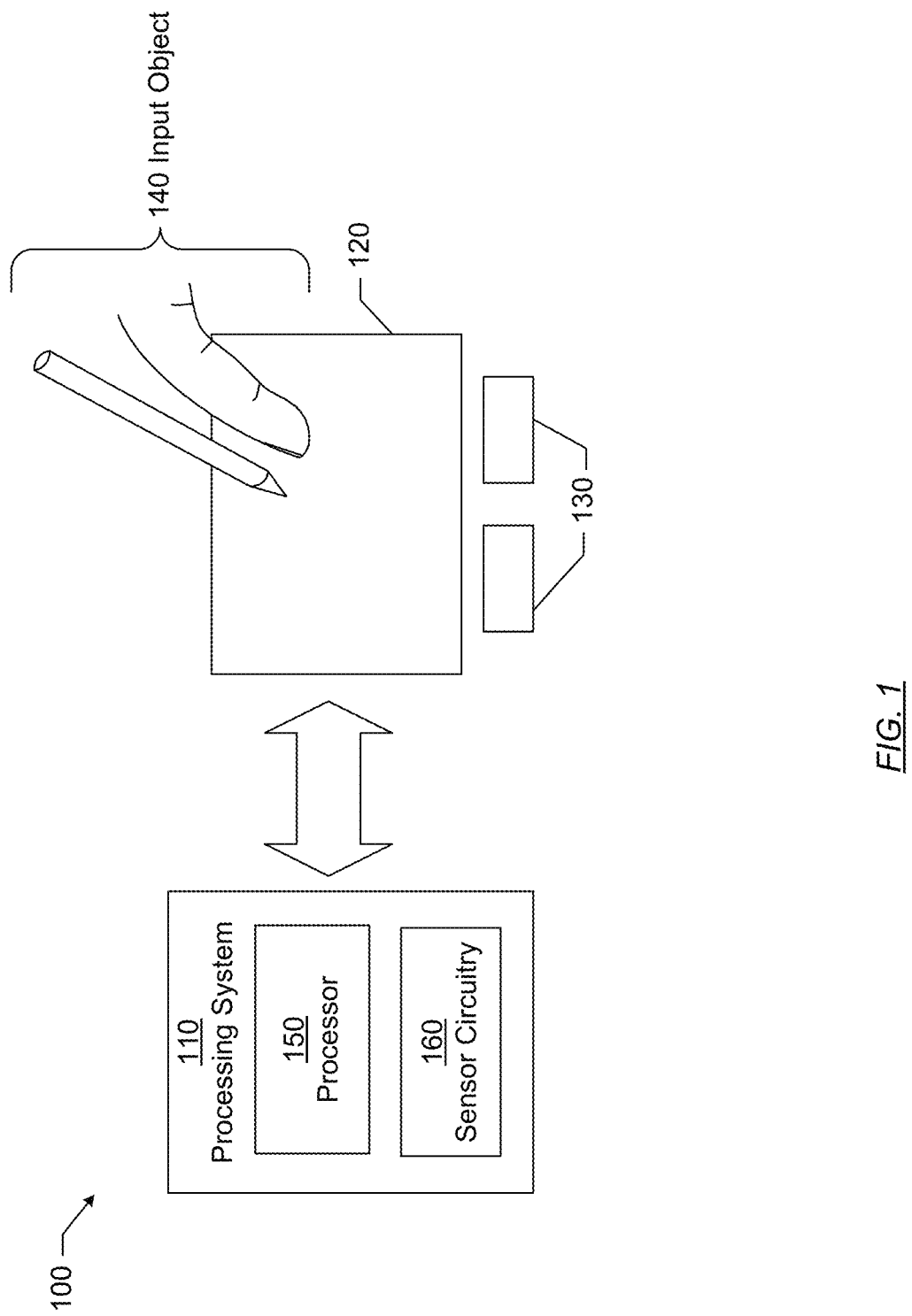
FIG. 1 shows a block diagram in accordance with one or more embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Various embodiments provide input devices and methods that facilitate improved usability. In particular, one or more embodiments are directed to a device that detects an input force using various force sensor electrodes. More specifically, one or more embodiments of the invention are directed to a device capable of true multi-point force detection. In one or more embodiments, for example, the force sensor electrodes are located in the display of an electronic system and are arranged in an array of full resistive bridges. In one or more embodiments, for example, the array of full resistive bridges has spatially correlated neighboring piezo-resistive electrodes on the same sensor substrate. All four electrodes of each full bridge share the same or similar thermal characteristics, and thus, respond the same to the thermal drift caused by a finger pressing down on the input device. At the same time, a pair of the electrodes arranged diagonally across each other share the same force response, while the opposite diagonal pair of electrodes has no force response. In one or more embodiments, with such an arrangement, by sensing differentially across the bridge, thermal drift is removed, while at the same time, piezo-resistive change due to the finger applying pressure is magnified.

Turning now to the figures, FIG. 1 is a block diagram of an exemplary input device (100), in accordance with embodiments of the invention. The input device (100) may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device (100) and separate joysticks or key switches. Further example electronic systems include peripherals, such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device (100) may be implemented as a physical part of the electronic system, or may be physically separate from the electronic system. Further, portions of the input device (100) as part of the electronic system. For example, all or part of the determination module may be implemented in the device driver of the electronic system. As appropriate, the input device (100) may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, the input device (100) is shown as a proximity sensor device (also often referred to as a "touchpad" or a "touch sensor device") configured to sense input provided by one or more input objects (140) in a sensing region (120). Example input objects include fingers and styli, as shown in FIG. 1. Throughout the specification, the singular form of input object is used. Although the singular form is used, multiple input objects exist in the sensing region (120). Further, which particular input objects are in the sensing region may change over the course of one or more gestures. For example, a first input object may be in the sensing region to perform the first gesture, subsequently, the first input object and a second input object may be in the above surface sensing region, and, finally, a third input object may perform the second gesture. To avoid unnecessarily complicating the description, the singular form of input object is used and refers to all of the above variations.

The sensing region (120) encompasses any space above, around, in and/or near the input device (100) in which the input device (100) is able to detect user input (e.g., user input provided by one or more input objects (140)). The sizes, shapes, and locations of particular sensing regions may vary widely from embodiment to embodiment.

In some embodiments, the sensing region (120) extends from a surface of the input device (100) in one or more directions into space until signal-to-noise ratios prevent sufficiently accurate object detection. The extension above the surface of the input device may be referred to as the above surface sensing region. The distance to which this sensing region (120) extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device (100), contact with an input surface (e.g. a touch surface) of the input device (100), contact with an input surface of the input device (100) coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region (120) has a rectangular shape when projected onto an input surface of the input device (100).

The input device (100) may utilize any combination of sensor components and sensing technologies to detect user input in the sensing region (120). The input device (100) includes one or more sensing elements for detecting user input. As several non-limiting examples, the input device (100) may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes. Further, some implementations may be configured to provide a combination of one or more images and one or more projections.

In some resistive implementations of the input device (100), a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device (100), one or more sensing elements pick up loop currents induced by a resonating coil or pair of coils. Some combination of the magnitude, phase, and frequency of the currents may then be used to determine positional information.

In some capacitance implementations of the input device (100), voltage or current is applied to create an electric field. Nearby input objects cause changes in the electric field, and produce detectable changes in capacitive coupling that may be detected as changes in voltage, current, or the like.

Some capacitance implementations utilize arrays or other regular or irregular patterns of capacitive sensing elements to create electric fields. In some capacitance implementations, separate sensing elements may be ohmically shorted together to form larger sensor electrodes. Some capacitance implementations utilize resistive sheets, which may be uniformly resistive.

Some capacitance implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. The reference voltage may by a substantially constant voltage or a varying voltage and in various embodiments; the reference voltage may be system ground. Measurements acquired using absolute capacitance sensing methods may be referred to as absolute capacitive measurements.

Some capacitance implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "transmitter") and one or more receiver sensor electrodes (also "receiver electrodes" or "receiver"). Transmitter sensor electrodes may be modulated relative to a reference voltage (e.g., system ground) to transmit transmitter signals (also called "sensing signal"). Receiver sensor electrodes may be held substantially constant relative to the reference voltage to facilitate receipt of resulting signals. The reference voltage may by a substantially constant voltage and in various embodiments; the reference voltage may be system ground. In some embodiments, transmitter sensor electrodes may both be modulated. The transmitter electrodes are modulated relative to the receiver electrodes to transmit transmitter signals and to facilitate receipt of resulting signals. A resulting signal may include effect(s) corresponding to one or more transmitter signals, and/or to one or more sources of environmental interference (e.g. other electromagnetic signals). The effect(s) may be the transmitter signal, a change in the transmitter signal caused by one or more input objects and/or environmental interference, or other such effects. Sensor electrodes may be dedicated transmitters or receivers, or may be configured to both transmit and receive. Measurements acquired using mutual capacitance sensing methods may be referred to as mutual capacitance measurements.

Further, the sensor electrodes may be of varying shapes and/or sizes. The same shapes and/or sizes of sensor electrodes may or may not be in the same groups. For example, in some embodiments, receiver electrodes may be of the same shapes and/or sizes while, in other embodiments, receiver electrodes may be varying shapes and/or sizes.

In FIG. 1, a processing system (110) is shown as part of the input device (100). The processing system (110) is configured to operate the hardware of the input device (100) to detect input in the sensing region (120). The processing system (110) includes parts of or all of one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes. Further, a processing system for an absolute capacitance sensor device may include driver circuitry configured to drive absolute capacitance signals onto sensor electrodes, and/or receiver circuitry configured to receive signals with those sensor electrodes. In one more embodiments, a processing system for a combined mutual and absolute capacitance sensor device may include any combination of the above described mutual and absolute capacitance circuitry. In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to the sensing element(s) of the input device (100), and one or more components elsewhere. For example, the input device (100) may be a peripheral coupled to a computing device, and the processing system (110) may include software configured to run on a central processing unit of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens, driving haptic actuators, etc.

The processing system (110) may be implemented as a set of modules that handle different functions of the processing system (110). Each module may include circuitry that is a part of the processing system (110), firmware, software, or a combination thereof. In various embodiments, different combinations of modules may be used. For example, as shown in FIG. 1, the processing system (110) may include a processor (150) and sensor circuitry (160). The processor (150) may include functionality to determine when at least one input object is in a sensing region, determine signal to noise ratio, determine positional information of an input object, identify a gesture, determine an action to perform based on the gesture, a combination of gestures or other information, and/or perform other operations.

The sensor circuitry (160) may include functionality to drive the sensing elements to transmit transmitter signals and receive the resulting signals. For example, the sensor circuitry (160) may include circuitry that is coupled to the sensing elements. The sensor circuitry (160) may include, for example, a transmitter and a receiver. The transmitter may include transmitter circuitry that is coupled to a transmitting portion of the sensing elements. The receiver may include receiver circuitry coupled to a receiving portion of the sensing elements and may include functionality to receive the resulting signals.

Although FIG. 1 shows a processor (150) and sensor circuitry (160), alternative or additional elements/modules may exist in accordance with one or more embodiments of the invention. Such alternative or additional modules may correspond to distinct modules or sub-modules than one or more of the modules discussed above. Example alternative or additional modules include hardware operation modules for operating hardware such as sensor electrodes and display screens, data processing modules for processing data such as sensor signals and positional information, reporting modules for reporting information, and identification modules configured to identify gestures, such as mode changing gestures, and mode changing modules for changing operation modes. Further, the various modules may be combined in separate integrated circuits. For example, a first module may be comprised at least partially within a first integrated circuit and a separate module may be comprised at least partially within a second integrated circuit. Further, portions of a single module may span multiple integrated circuits. In some embodiments, the processing system as a whole may perform the operations of the various modules.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions. In one or more embodiments, the electronic system includes one or more components as described in FIG. 2.1.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. As yet further examples, the processing system (110) may determine positional information, determine force information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" (3D) positional information includes instantaneous or average velocities in space. Further examples include other representations of spatial information. Historical data regarding one or more types of positional information may also be determined and/or stored, including, for example, historical data that tracks position, motion, or instantaneous velocity over time.

"Force information" as used herein is intended to broadly encompass force information regardless of format. For example, the force information may be provided for each object as a vector or scalar quantity. As another example, the force information may be provided as an indication that determined force has or has not crossed a threshold amount. As other examples, the force information can also include time history components used for gesture recognition. As will be described in greater detail below, positional information and force information from the processing systems may be used to facilitate a full range of interface inputs, including use of the proximity sensor device as a pointing device for selection, cursor control, scrolling, and other functions.

In some embodiments, the input device (100) is implemented with additional input components that are operated by the processing system (110) or by some other processing system. These additional input components may provide redundant functionality for input in the sensing region (120), or some other functionality. FIG. 1 shows buttons (130) near the sensing region (120) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a touch screen interface, and the sensing region (120) overlaps at least part of an active area of a display screen. For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. In various embodiments, one or more display electrodes of a display device may configured for both display updating and input sensing. As another example, the display screen may be operated in part or in total by the processing system (110).

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media that is readable by the processing system (110)). Additionally, the embodiments of the present invention apply equally regardless of the particular type of medium used to carry out the distribution. For example, software instructions in the form of computer readable program code to perform embodiments of the invention may be stored, in whole or in part, temporarily or permanently, on a non-transitory computer readable storage medium. Examples of non-transitory, electronically readable media include various discs, physical memory, memory, memory sticks, memory cards, memory modules, and or any other computer readable storage medium. Electronically readable media may be based on flash, optical, magnetic, holographic, or any other storage technology.

Although not shown in FIG. 1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores, or micro-cores of a processor. Further, one or more elements of one or more embodiments may be located at a remote location and connected to the other elements over a network. Further, embodiments of the invention may be implemented on a distributed system having several nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

Figure 2:
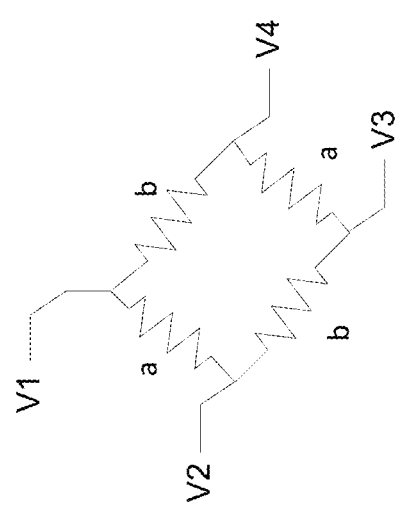
FIG. 2.1 shows a circuit diagram in accordance with one or more embodiments.

In FIG. 2.1, a circuit diagram is depicted in accordance with one or more embodiments of the invention. Specifically, the circuit diagram has two types of resistors, resistor 'a' and resistor 'b', placed in a bridge configuration as shown. In one or more embodiments of the invention, the pair of type 'a' resistors may share a common property or characteristic, and the pair of type 'b' resistors may also share a common property or characteristic. More specifically, in one or more embodiments, resistor type 'a' responds only to thermal drift, when a finger is pressed down on a particular sensing area of an input device, for example, resulting in the creation of a "hot spot" or thermal drift in that sensing region. Resistor type 'b', on the other hand, responds to both thermal drift and the force that is generated by the finger pressing down on the input surface. In other words, a pair of the resistors 'b' located diagonally across each other shares the same force response, while the other pair of resistors in a transverse direction 'a' has opposing or at least no force response. Accordingly, all four resistors share the same or similar thermal characteristics, but the force response differs in diagonal pairs of resistors.

In one or more embodiments of the invention, such a pattern may be created by using a different material for resistors 'a' and resistors 'b.' Those skilled in the art will appreciate that different degrees of piezoresistive effect on different conductive materials is well-known in art. Thus, varying the materials of resistive types 'a' and 'b' respectively, results in one pair being responsive to both thermal drift and force, while another pair of resistive material is only responsive to thermal drift. Examples of such materials may include, but are not limited to transparent metal such as ITO and PEDOT:PSS. Carbon nanotubes and graphene are other possibilities. SiOx used typically as an insulation layer may also be considered as a resistor at least of several mega ohm within the scope of the present invention.

In an alternate embodiment, the pattern of the pairs of resistors may be achieved by varying the geometry of the resistors, where for example, resistors of type 'b' are of a much smaller geometric footprint than the resistors of type "a."

In FIG. 2.1, four nodes are shown, V1, V2, V3, and V4. Applying a positive voltage VDD to node V1, and ground GND to node V3, for example as shown in corresponding table of FIG. 2.2, and using basic Ohm's Law and voltage divider principles, well known in the art, the voltage differential, or change in voltage V4–V2 may be measured and observed. Said another way, a first signal from the first force sensing node (V4) and a second signal from the second force sensing node (V2) may be received by a processor such as that described in FIG. 1 above. The first signal may include a thermal response, whereas the second signal includes the thermal response and a measure of an applied force.

In accordance with one or more embodiments of the invention, the basic circuit diagram shown in FIG. 2.1 is used to form a strain gauge array of piezo-resistive electrodes, where two kinds of the electrodes denoted as 'a' and 'b' alternate in daisy-chain connection. The term "electrode" refers broadly to any sensing element, e.g., capacitive touch sensing electrode, or piezo-resistive electrodes, or any other suitable metal element for sensing. Piezo-resistive electrodes have a property whereby when mechanical strain (e.g., pressure applied by a finger touching the input device) is applied, a change in the electrical resistivity of the piezo-resistive electrode is exhibited. The nodes and resistors together form electrodes that may be used for capacitive touch sensing or force sensing, in accordance with the description of FIG. 1 above. A full-bridge arrangement is formed by four electrodes and four resistors arranged, for example, as shown in FIG. 2.1. The array of piezo-resistive electrodes may be formed in various topologies, as will be explained in the examples of FIGS. 4.1, 4.2, 4.3, 5.1, 5.2, 5.3, 6.1, 6.2, and 6.3.

Figure 3:
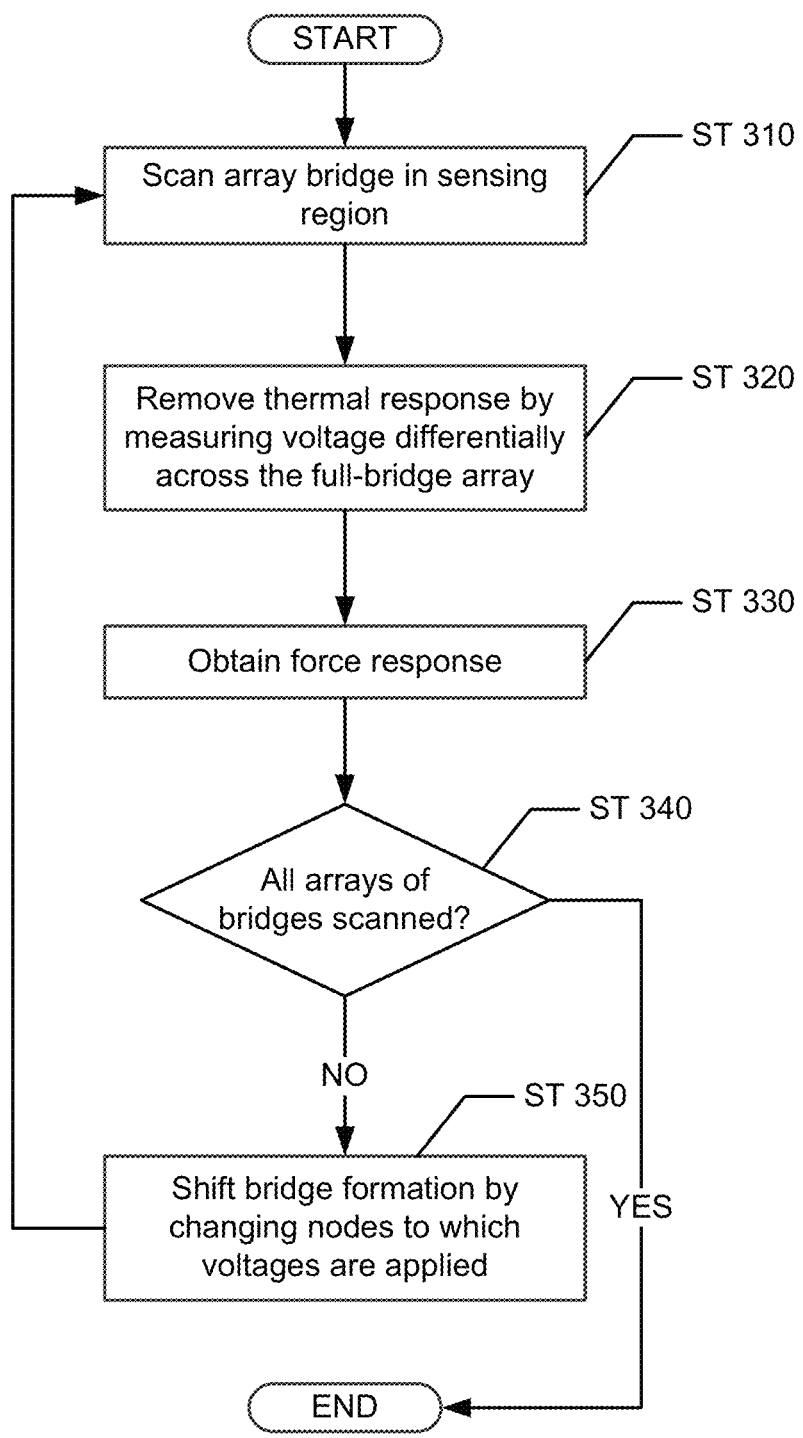
FIG. 3 shows a flowchart in accordance with one or more embodiments.

FIG. 3 shows a flow chart for the process of eliminating thermal drift in a strain gauge array of piezo-resistive electrodes accordance with one or more embodiments of the invention.

Initially, in ST 310, the array bridge in the active area or 2-dimensional sensing region on the input surface of an input device is scanned to determine the positional location of an object and to observe the force and thermal response of the object applying force in the sensing region. The sensing region may be the region around which a "hot spot" or finger press of a user exists on the input surface. Alternatively, the sensing region may be the entirety of the input surface capable of receiving touch/force input.

In ST 320, the thermal response of the four electrodes forming the full bridge array is removed or cancelled out. As described above, all four electrodes have the same (equivalent) thermal response when an object touches the sensing region of the input device. However, only one pair of the electrodes located diagonally across from each other in the full bridge formation has a response to the force applied by the same object. In one or more embodiments of the invention, calculating the voltage differential (i.e., the change in voltage) across the full-bridge strain gauge array of electrodes results in the cancellation (or elimination) of the thermal response, so that only the force response remains and may be observed independent of the thermal drift. Those skilled in the art will appreciate that the cancellation of the thermal response is a result of the voltage divider principles/equations that are used to calculate the differential voltage across the full-bridge electrode configuration, as described above with respect to FIG. 2.

As a result of the calculations performed in ST 320, the force response only may be observed in ST 330. In one or more embodiments of the invention, sensing differentially across the bridge removes any thermal drift coupled to each electrode equally while at the same time piezo-resistive change due to finger applying stress is magnified (e.g., doubled or quadrupled).

In ST 340, a determination is made as to whether all the arrays of the bridges in the sensing region of the input device have been scanned. In one or more embodiments, the array of bridges can be scanned all at the same time, if enough analog front-ends are available to capture the plurality of outputs from each bridge. Thus, if all the arrays are scanned simultaneously (ST 340), then the process ends. Alternatively, the array of bridges may be scanned progressively by shifting the bridge formation (i.e. changing the nodes to which voltages are applied and on which voltages are measured) per scan (ST 350). The outputs may then be multiplexed at the front-end to obtain a result of the total scanned sensing region. See e.g., FIGS. 4.2 and 5.2.

The following examples demonstrate various embodiments of the invention and are not meant to limit the invention in any way. In each of the examples discussed below, the array of piezoresistive elements in full-bridge configuration is embedded into an existing topology of the capacitive electrodes, which already exist for capacitive touch sensing capability on an input device such as that described in FIG. 1 above.

In FIGS. 4.1, 4.2, and 4.3, an example 1-dimensional array of piezo-resistive electrodes is depicted in accordance with one or more embodiments of the invention. FIGS. 4.1, 4.2, and 4.3 show an example first topology into which the array of piezo-resistive electrodes is embedded. In one or more embodiments, in the topology of FIGS. 4.1, 4.2, and 4.3, the capacitive electrodes themselves (the metal portion of the electrodes) are also piezo-resistive elements.

In FIG. 4.1, a circuit similar to that of FIG. 2.1 is shown, in which two types of electrodes, denoted as 'a' and 'b' alternate in a daisy-chain configuration. As described above in FIG. 2.1, the change in resistance as a function of a finger applied stress and associated thermal effect are different between the two types of electrodes. In one or more embodiments of the invention, electrode 'a' is only sensitive to thermal drift, and electrode 'b' is sensitive to both thermal drift and applied mechanical stress. The response characteristics between these two types of electrodes may be made different either by varying the geometric pattern/footprint of each type of electrode, or by varying the material of the electrodes such that the intrinsic material property of electrode 'a' is distinct from that of electrode 'b'.

Continuing with FIG. 4.1, VDD (406) is applied at one node, and GND (408) is applied at the opposite node. As described in FIG. 3 above, by measuring the voltage differentially across the nodes V+ (402) and V− (404), the thermal effect is cancelled out, while the change in resistance caused by applied stress alone is doubled. In one or more embodiments of the invention, in order to prevent the output voltage from derailing, an additional reference resistor of (Ra+Rb)/2 ohms, known as the DC offset resistor (410) may be added to the circuit. The DC offset resistor centers the output voltage near approximately VDD/2.

FIG. 4.2 shows the geometric footprint of electrodes 'a' and 'b'. As can be seen in the drawing, electrode 'a' as a larger geometric footprint than electrode "b." The circle in the middle of the electrodes (410) represents the "hot spot" caused by a finger applying mechanical stress onto the sensing region. In FIG. 4.2, the finger covers four electrodes, two of type 'a' and two of type 'b' forming a full bridge configuration. In one embodiment of the invention, the full bridge is formed in spatial proximity to the object applying pressure on the input surface. When the plurality of electrodes are scanned, the signal from each node is multiplexed and fed into a general purpose analog to digital converter (GPADC) to obtain the output result. Those skilled in the art will appreciate that for the topology shown in FIGS. 4.1-4.3, all the arrays may be scanned simultaneously, if the hardware circuitry (analog to digital converters) to accommodate such simultaneously outputs is available. In other words, multiplexing is optional, and merely for the purpose of saving the number of GPADCs required.

The table of FIG. 4.3 corresponds to the electrodes shown in FIG. 4.1. The table shows, in one embodiment, how the arrays of electrodes are scanned, by applying VDD and GND to the nodes as shown, and correspondingly measuring the differential voltage across the bridge. For example, VDD may be applied to V1, V5, V9 . . . V(1+4n), and GND is applied to V3, V7, V11 . . . V(3+4n), thereby allowing the measurement of the voltage differential across V2−V4. Similarly, when VDD is applied to V5, GND to V7, the voltage differential across V4−V6 may be obtained. This process continues until all the bridges have been scanned to obtain an output result representing a measurement of the applied force across the scanned bridge array that is in spatial proximity to the object applying mechanical stress on the input surface.

Those skilled in the art will appreciate that the object applying stress on the input surface of the input device may be a user's finger. Because a finger is associated with heat, the temperature drift caused by a finger is more than that of the 2-dimensional input device surface. However, the invention is not limited to the object being a user's finger. In one or more embodiments, the object may be any other suitable object capable of causing a thermal response in the underlying piezo-resistive element, without departing from the scope of the invention. For example, the object may be a heat-producing stylus.

In the depiction of FIGS. 4.1, 4.2, and 4.3, the electrodes that form the strain gauges may also be used as transmitters for a capacitive sensor. Thus, in one or more embodiments of the invention, in the topology of FIG. 4.1-4.3, resistor type 'b' may have a very large resistance value relative to that of resistor type "a." In this manner, a sensing electrode incorporating resistor type 'a' may be used mostly for capacitive sensing (charge pumping) while a sensing electrode incorporating resistor type 'b' may be used to minimizes "bleed-over" of charges from one 'a' electrode to another.

Further, the electrodes of the first type ('a') may be coupled to electrodes of the second type ('b'). Further, in the first topology of FIGS. 4.1, 4.2, and 4.3, the electrodes themselves which act also as piezo-resistive elements, may be of different material property to achieve different piezoresistive responses between 'a' and 'b.' Those skilled in the art will appreciate that the piezo-resistive elements or layer may be also formed independent of the capacitive sensors in the input device. This is discussed further in FIGS. 5 and 6 below.

In one or more embodiments, the topology of FIGS. 5.1, 5.2, and 5.3 illustrates a 2-dimensional array of piezo-resistive electrodes, where the piezoresistive elements are embedded in the medium between adjacent electrodes, which is an independent insulation layer or substrate. More specifically, the piezo-resistive layer may be placed directly over or under each electrode, where the electrodes act only as probe points to obtain measurements. In one or more embodiments of the invention, as shown in FIG. 5.2, the piezo-resistive layer may be a PEDOT:PSS layer, which is made up of a polymer mixture of two ionomers. One component in this mixture is made up of sodium polystyrene sulfonate which is a sulfonated polystyrene. Those skilled in the art will appreciate that the PEDOT:PSS is only an example and is not meant to limit the invention. The piezo-resistive layer may be any semiconductor or metal material that exhibits a change in the electrical resistivity when mechanical strain is applied, without departing from the scope of the invention.

In the topology of FIGS. 5.1, 5.2, and 5.3, (and also in the topology of FIG. 6 discussed below), capacitive touch electrodes are of metal elements, while piezoresistive electrodes are those of the highly resistive insulation layer between two metal capacitive touch electrodes. In these topologies, the electrodes that form the strain gauge may also be used to form electrodes of a matrix sensor (e.g., a sensor that is integrated within a display). In such an embodiment, the electrodes of the first type ('a') may be coupled to electrodes of the second type ('b'), and the metal probe elements of electrodes which interact with resistive type ('b') may be interdigitated, while resistive type ('a') is not or may be less interdigitated. Said another way, the metal probes (and not the peizoresistive elements 'a' and 'b' themselves, which are in a layer above or below the interdigitation of metal probes) are interdigitated.

As can be observed in the difference in topology between FIG. 4.2 and FIG. 5.2, in FIG. 5.2, the resistor of type 'a' hangs off each metal element for capacitive sensing (elements 11-33), shown in the shape of an "L," while the resistor of type 'b' is in between two adjacent metal electrodes (i.e., one resistor type 'b' is in between electrodes 11 and 21, another in between 21 and 31, another in between 12 and 22, etc.). This is in contrast to the topology of FIGS. 4.1, 4.2, and 4.3, in which the metal electrodes for capacitive sensing were the same as the piezo-resistive elements. Thus, in FIG. 5.2, the difference in the geometrical footprint of electrode of type 'a' and electrode of type 'b' may be observed. Those skilled in the art will appreciate that although the two types of electrodes are shown with different geometries, they may also have an identical geometric footprint.

In accordance with the table of FIG. 5.3, the same process of applying VDD and GND to various nodes, and calculating a voltage differential across the nodes of a full bridge array, as described with respect to FIGS. 4.1, 4.2, and 4.3 above, are performed in the example of FIGS. 5.1, 5.2, and 5.3. As with FIGS. 4.1, 4.2, and 4.3 above, the plurality of nodes can be scanned progressively and multiplexed, or, given a sufficient number of analog to digital converters, scanned simultaneously, to obtain a result that represents a measure of the applied mechanical stress of a finger pressing down on the surface of the input device, because the thermal response is cancelled out when the voltage differential is calculated. By way of example, the number of multiplexers employed may be n−1, where n is the row count of capacitive nodes.

In one or more embodiments, to obtain a difference piezo-resistive response from the electrode of type 'a' and the electrode of type 'b' in FIGS. 5.1 and 5.2, the Poisson effect may be leveraged. The Poisson effect states that when a material is compressed in one direction, the material tends to expand in the other two directions perpendicular to the direction of compression. Accordingly, when pressure is applied from the top of the input surface, the change in resistance across one direction yields a change of opposite polarity in the other transverse direction. This relationship may be leveraged to obtain a difference in response of the two electrode types to isolate or magnify the measure of the applied force. In one or more embodiments, the magnification of the applied force signal by leveraging the Poisson effect in a 2-dimensional configuration such as that of FIGS. 5.1, 5.2, and 5.3 may be double that of the magnification using the 1-dimensional configuration of FIGS. 4.1, 4.2, and 4.3.

In one or more embodiments of the invention, the 2-dimensional strain gauge array as shown in FIGS. 5.1, 5.2, and 5.3, for example, are configured to provide a 2D force image.

In FIGS. 6.1, 6.2, and 6.3 another example 2-dimensional array of piezo-resistive electrodes is depicted in accordance with one or more embodiments of the invention. FIGS. 6.1, 6.2, and 6.3 show an example third topology in which the array of piezo-resistive electrodes (602) is embedded. In one or more embodiments, in the topology of FIGS. 6.1, 6.2, and 6.3, the medium between two orthogonal electrodes are of piezo-resistive elements (602), which is an independent insulation layer. Said another way, the piezo-resistive strain gauge is formed in the cross-section between one vertically positioned electrode and one horizontally positioned electrode.

FIG. 6.1 depicts a circuit diagram in which transmit and receive electrodes are shown in a grid configuration, with the columns R1-R3 being the touch receive electrodes and the rows T1-T3 being the transmit electrodes. The intersection of the two (e.g., R1, T1) represents a capacitive touch node 608. In this configuration, as well as in the configuration of FIG. 5.1, a piezoresistive force internode (606) is observed in-between as only one measurement is made per one full-bridge strain gauge, comprising one pair of resistors of type 'a' and one pair of resistors of type 'b'. As described above, the two pairs of resistors form the full-bridge such that the "force" measured is associated with the internode 606. The right side of FIG. 6.1 shows the circuit equivalents to the node arrangement formed by the rows T1-T3 and columns R1-R3. The equivalent circuits are similar to those discussed above with respect to FIGS. 2.1 and 4.1.

In FIG. 6.2, the difference in the geometrical footprint of piezo-resistive element 'a' vs. 'b' may be observed. The area under rectangular shaped 'b' is less than the area under the square of "a." In the example of FIG. 2, the shape of the electrodes of the first type 'a' and second type 'b' alternate per sensor electrode. The "hot spot" of an object applying pressure (604) on the sensing region of the input device is shown as a circle overlaying four electrodes. These four electrodes form the full bridge configuration discussed above, such that the voltage differential may be calculated to determine the applied force on the full bridge array. In FIG. 6.3, the table shows the application of VDD and GND to each scan (Scan 1–Scan n−1, where n is the row count of capacitive nodes). In the configuration of FIG. 6.1, voltage is applied across a row T, and GND is applied across an adjacent row T. Thus, in the first scan, for example, VDD is applied across line T1, while GND is applied across line T2. The differential voltage is then measured across R1-R2, R2-R3, etc. Thus, more simultaneous measurements may be obtained, across multiple bridges. In Scan 2, the VDD and GND applications are shifted over by one, to VDD on node T2, and GND applied to node T3. The differential voltage is measured across the same R1-R2, R2-R3, etc. As shown in FIG. 6.2, the output of each pair of resistors for each scan is multiplexed to obtain a resultant measurement of applied force.

As can be observed in the difference in topology between FIG. 5.1 and FIG. 6.1, in FIG. 6.1, the resistive change is measured in a perpendicular direction, between the vertical columns of R1-R3 and the horizontals rows T1-T3. In contrast, in the topology of FIG. 5.2, the resistive change is measured in a more horizontal direction. This is due to the placement of the piezo-resistive layer (502, 602) in each of the different topologies.

For the topology of FIGS. 6.1-6.3, time multiplexing (multiple scans) is mandatory. Because multiple metal probe portions are ohmically shorted together (defining rows and columns of electrodes), it is not possible to associate a measurement made on a particular pair of columns with respect to a particular pair of rows applied with voltages (VDD and GND), when the application of the voltages to all rows are made simultaneously. As such, only one pair of rows is applied with voltages at any given instance and all other rows need to be tri-stated so as not to have any effect on the measurement. For example, for Scan 1, only T1 is applied with VDD, and T2 is applied with GND, and all the rest namely T3, T4 . . . Tn are all floated, as shown in the table of FIG. 6.3.

In one embodiment of the invention, in the topologies of FIGS. 5-6, both resistor types 'a' and 'b' are of separate entities from that of capacitive sensing electrode. As a result, their resistances may be much higher relative to that of a capacitive sensing electrode (Rb>>Ra>>Rcap).

In one or more embodiments of the invention, the electrodes of the full bridge strain gauge array in any of the examples of FIGS. 4.1, 4.2, and 4.3, 5.1, 5.2, and 5.3, and 6.1, 6.2, and 6.3 may be display electrodes (e.g., segments of the segmented Vcom) that may be used for display updating and force sensing. The same electrodes may also be used for capacitive sensing as described with respect to FIG. 1 above. This allows for true multi-point force performance by leveraging the shared electrode role between the capacitive touch electrodes, which are also used to detect force by implementing the layer of piezo-resistive elements as shown in the examples above. Further, the "pitch" of the sensing node may correspond to the size of the input object that is being sensed on the sensing region, such that an entire node is interacted with by the input object.

In the topologies of FIGS. 5.1, 5.2, and 5.3 and 6.1, 6.2, and 6.3, the more piezoresistive elements between two electrodes are in parallel, the less change in resistance may be observed due to piezoresistive effect. Those of ordinary skill in the art will appreciate that in all three topologies discussed above, geometries of the electrodes may be designed differently to achieve different piezoresistive responses between 'a' and 'b.' Further, the independent piezoresistive elements between electrodes may be of different material property to achieve different piezoresistive responses between 'a' and 'b.'

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A force sensor, comprising:
   a full-bridge strain gauge array configured to provide a 2D force image and comprising:
      a first capacitive touch sensor receiver electrode coupling:
         a first piezo-resistive element of a first resistor type that has a force response and a thermal response to an input object; and
         a second piezo-resistive element of a second resistor type that has the thermal response but no force response to the input object; and
      a second capacitive touch sensor receiver electrode coupling:
         a third piezo-resistive element of the first resistor type coupled to the second piezo-resistive element; and
         a fourth piezo-resistive element of the second resistor type coupled to the first piezo-resistive element,
      wherein the first, second, third, and fourth piezo-resistive elements are subjected to a force applied by the input object,
      wherein the third piezo-resistive element and the second piezo-resistive element are coupled to a first capacitive touch sensor transmitter electrode that is orthogonal to the first touch sensor receiver electrode, and
      wherein the first piezo-resistive element the fourth piezo-resistive element are coupled to a second capacitive touch sensor transmitter electrode; and
   a processing system communicatively coupled to the full-bridge strain gauge array, the processing system being configured to:
      receive a first signal from the first capacitive touch sensor receiver electrode and a second signal from the second capacitive touch sensor receiver electrode, wherein the first signal reflects the thermal response, and the second signal reflects the thermal response and the force response; and
      determine the force by removing the thermal response through a comparison of the first and second signals.

2. The force sensor of claim 1, wherein the comparison of the first and second signals comprises:
   measuring a differential voltage across the first capacitive touch sensor receiver electrode and second capacitive touch sensor receiver electrode.

3. The force sensor of claim 1, wherein the second resistor type comprises a larger geometric footprint than the first resistor type.

4. The force sensor of claim 1, wherein the first resistor type comprises a different material than the second resistor type.

5. The force sensor of claim 1, wherein the first resistor type has a greater resistance than the second resistor type.

6. An input device, comprising:
   an input surface;
   a full-bridge strain gauge array in a sensing area of the input surface and configured to provide a 2D force image, comprising:
      a first force sensing node coupling:
         a first piezo-resistive element of a first resistor type that has a force response and a thermal response to an input object; and
         a second piezo-resistive element of a second resistor type that has the thermal response but no force response to the input object; and
      a second force sensing node coupling:
         a third piezo-resistive element of the first resistor type coupled to the second piezo-resistive element; and
         a fourth piezo-resistive element of the second resistor type coupled to the first piezo-resistive element,
      wherein the first, second, third, and fourth piezo-resistive elements are subjected to a force applied by the input object,
      wherein the first force sensing node and the second force sensing node are metal capacitive touch sensing electrodes, and wherein the first piezo-resistive element and the third piezo-resistive element are embedded in a layer above or below the metal capacitive touch sensing electrodes; and a processing system communicatively coupled to the full-bridge strain gauge array, the processing system configured to:

receive a first signal from the first force sensing node and a second signal from the second force sensing node, wherein the first signal reflects the thermal response, and the second signal reflects the thermal response and the force response; and determine the force by removing the thermal response through a comparison of the first and second signals.

7. The input device of claim 6, wherein the comparison of the first and second signals comprises:

measuring a differential voltage across the first and second force sensing nodes.

8. The input device of claim 6, wherein the second resistor type comprises a larger geometric footprint than the first resistor type.

9. The input device of claim 6, wherein the first resistor type comprises a different material than the second resistor type.

10. A processing system, comprising:

sensor circuitry communicatively coupled to a full-bridge strain gauge array comprising:

a first capacitive touch sensor receiver electrode coupling:

a first piezo-resistive element of a first resistor type that has a force response and a thermal response to an input object; and a second piezo-resistive element of a second resistor type that has the thermal response but no force response to the input object; and a second capacitive touch sensor receiver electrode coupling:

a third piezo-resistive element of the first resistor type coupled to the second piezo-resistive element; and a fourth piezo-resistive element of the second resistor type coupled to the first piezo-resistive element, wherein the first, second, third, and fourth piezo-resistive elements are subjected to a force applied by the input object, wherein the third piezo-resistive element and the second piezo-resistive element are coupled to a first capacitive touch sensor transmitter electrode that is orthogonal to the first touch sensor receiver electrode, and wherein the first piezo-resistive element the fourth piezo-resistive element are coupled to a second capacitive touch sensor transmitter electrode; and a processor configured to:

receive a first signal from the first capacitive touch sensor receiver electrode and a second signal from the second capacitive touch sensor receiver electrode, wherein the first signal reflects the thermal response, and the second signal reflects the force response and the thermal response; and determine the force by removing the thermal response through a comparison of the first and second signals.

11. The processing system of claim 10, wherein the comparison of the first and second signals comprises:

measuring a differential voltage across the first capacitive touch sensor receiver electrode and second capacitive touch sensor receiver electrode.

12. The force sensor of claim 1, wherein the first, second, third, and fourth piezo-resistive elements are embedded in a plurality of capacitive touch sensor transmitter electrodes.

* * * * *

UNITED STATES PATENT AND TRADEMARK OFFICE
CERTIFICATE OF CORRECTION

PATENT NO. : 10,296,148 B2
APPLICATION NO. : 15/252420
DATED : May 21, 2019
INVENTOR(S) : Tetsuo Tanemura et al.

Page 1 of 1

It is certified that error appears in the above-identified patent and that said Letters Patent is hereby corrected as shown below:

In the Claims

Claim 1, Column 16, Line 15, the word -- and -- should be inserted between the words "element" and "the".

Claim 10, Column 18, Line 15, the word -- and -- should be inserted between the words "element" and "the".

Signed and Sealed this
Fourteenth Day of April, 2020

Andrei Iancu
*Director of the United States Patent and Trademark Office*